United States Patent
Lee et al.

(10) Patent No.: US 9,932,433 B2
(45) Date of Patent: Apr. 3, 2018

(54) METHOD FOR PREPARING NITRILE-BASED RUBBER

(71) Applicant: LG Chem, Ltd., Seoul (KR)

(72) Inventors: Jae Min Lee, Daejeon (KR); Se Eun Lee, Daejeon (KR); Byoung Yun Kim, Daejeon (KR); In Sung Jo, Daejeon (KR); Woo Seok Choi, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/888,144

(22) PCT Filed: Jun. 5, 2015

(86) PCT No.: PCT/KR2015/005663
§ 371 (c)(1),
(2) Date: Oct. 30, 2015

(87) PCT Pub. No.: WO2016/072577
PCT Pub. Date: May 12, 2016

(65) Prior Publication Data
US 2017/0226253 A1    Aug. 10, 2017

(30) Foreign Application Priority Data

Nov. 4, 2014 (KR) .................. 10-2014-0152272

(51) Int. Cl.
| | |
|---|---|
| *C08F 236/12* | (2006.01) |
| *C08K 5/09* | (2006.01) |
| *C08K 3/04* | (2006.01) |
| *C08J 3/24* | (2006.01) |
| *C08C 3/02* | (2006.01) |
| *C08C 19/20* | (2006.01) |

(52) U.S. Cl.
CPC ............. *C08F 236/12* (2013.01); *C08C 3/02* (2013.01); *C08C 19/20* (2013.01); *C08J 3/24* (2013.01); *C08K 3/04* (2013.01); *C08K 5/09* (2013.01)

(58) Field of Classification Search
CPC ......... C08F 236/12; C08C 19/20; C08C 3/02; C08K 3/04; C08K 5/09
See application file for complete search history.

(56) References Cited

U.S. PATENT DOCUMENTS

| | | | |
|---|---|---|---|
| 8,367,778 B2 * | 2/2013 | Viola | C08C 1/04 525/329.1 |
| 2002/0030667 A1 | 3/2002 | Hinckley et al. | |
| 2005/0154122 A1 | 7/2005 | Ota et al. | |
| 2008/0293869 A1 | 11/2008 | Obrecht | |
| 2014/0124986 A1 | 5/2014 | Lima et al. | |

FOREIGN PATENT DOCUMENTS

| | | |
|---|---|---|
| DE | 102007024011 A1 | 11/2008 |
| EP | 2548919 A1 | 1/2013 |
| JP | H0873661 A | 3/1996 |
| JP | 2002145964 A | 5/2002 |
| JP | 2003342303 A | 12/2003 |
| JP | 2010065225 A | 3/2010 |
| KR | 10-0568410 B1 | 4/2006 |
| KR | 20110065019 A | 6/2011 |
| KR | 20110070017 A | 6/2011 |
| KR | 101310438 B1 | 9/2013 |
| KR | 2014-0047084 A | 4/2014 |
| WO | 0238641 A1 | 5/2002 |

OTHER PUBLICATIONS

Database WPI, Week 201216, Thompson Scientific, London, GB, AN 2011-H74272, XP002764379.
Search Report from European Application No. 15781841.0, dated Nov. 28, 2016.
International Search Report from PCT/KR2015/005663, dated Aug. 31, 2015.

* cited by examiner

*Primary Examiner* — Robert Harlan
(74) *Attorney, Agent, or Firm* — Lerner, David, Littenberg, Krumholz & Mentlik, LLP (57) ABSTRACT

Provided are a method for preparing a nitrile-based rubber having an amount of ethylenically unsaturated nitrile of 34 wt % or less including preparing a polymer by performing a polymerization reaction by adding an ethylenically unsaturated nitrile-based monomer in two or more portions to a conjugated diene-based monomer, and coagulating the polymer by adding a sulfur-based coagulant to the polymer, and a nitrile-based rubber thus prepared having improved mechanical properties as well as excellent processability and low temperature characteristics.

21 Claims, 2 Drawing Sheets

METHOD FOR PREPARING NITRILE-BASED RUBBER

CROSS-REFERENCE TO RELATED APPLICATION

The present application is a national phase entry under 35 U.S.C. § 371 of International Application No. PCT/KR2015/005663, filed Jun. 5, 2015, which claims priority from Korean Application No. 10-2014-0152272, filed Nov. 4, 2014, all of which are incorporated herein by reference.

TECHNICAL FIELD

The present invention relates to a method for preparing a nitrile-based rubber having improved mechanical properties as well as excellent processability and low temperature characteristics.

BACKGROUND ART

In general, a nitrile-based rubber is a polymer which is prepared by copolymerization of a conjugated diene-based monomer, such as butadiene, and an ethylenically unsaturated nitrile-based monomer such as acrylonitrile.

It is known that a nitrile-based rubber has excellent oil resistance due to the use of an ethylenically unsaturated nitrile-based monomer including a highly polar nitrile group, specifically, acrylonitrile (ACN), during the preparation. Also, the amount of ethylenically unsaturated nitrile included in the nitrile-based rubber affects various vulcanization properties of the nitrile-based rubber. Specifically, in a case in which ACN is used as the ethylenically unsaturated nitrile-based monomer, when the amount of the ACN in the nitrile-based rubber is increased, resistance to hydrocarbon fuels and petroleum-based fluids is increased, and heat resistance, ozone resistance, wear resistance, tensile strength, hardness, and density are increased, but low temperature flexibility, resilience, and gas permeability are decreased.

Nitrile-based rubbers are classified into 5 grades including low nitrile (amount of ACN in the rubber: 18 to 20%), medium and low nitrile (amount of ACN in the rubber: 28 to 29%), medium nitrile (amount of ACN in the rubber: 33 to 34%), high nitrile (amount of ACN in the rubber: 38 to 39%), and ultra-high nitrile (amount of ACN in the rubber: 45 to 48%), according to the amount of the ethylenically unsaturated nitrile-based monomer, e.g., ACN. In general, the high nitrile and ultra-high nitrile are used in areas in which resistance to hydrocarbon having a high aromatic content, such as gasoline, is required. Also, the medium nitrile is used in a case in which swelling of a rubber product is not an issue or oil has a low aromatic content. The low nitrile and the medium and low nitrile are mainly used in the preparation of liquids having an insignificant swelling effect, such as paraffin oil or polyalphaolefin, or foamed insulation materials and hoses requiring low temperature characteristics such as low temperature resistance.

Typically, during the polymerization of a nitrile-based rubber having an amount of ACN of 34 wt % or less, ACN having high reactivity is first consumed in the polymerization process, and a butadiene (BD) block (azeotropic composition of AN:BD=34:66, 10° C.) is generated when a conversion rate into the nitrile-based rubber is 60% or more. However, the generation of the butadiene block in the nitrile-based rubber causes the extension of the range of glass transition temperature (Tg) of the nitrile-based rubber, generates multiple Tgs, and furthermore, results in the reduction of resilience and low temperature characteristics.

In order to address such limitations, a method of suppressing the generation of the butadiene block by dividedly adding ACN during the polymerization of the nitrile-based rubber has been suggested. However, the processability and low temperature characteristics of the nitrile-based rubber may be improved by the above method, but tensile stress and stiffness of the rubber may be reduced.

Thus, there is a need to develop a method for preparing a nitrile-based rubber having improved mechanical properties as well as excellent processability and low temperature characteristics.

DISCLOSURE OF THE INVENTION

Technical Problem

The present invention provides a method for preparing a nitrile-based rubber having improved mechanical properties as well as excellent processability and low temperature characteristics.

The present invention also provides a nitrile-based rubber prepared according to the above preparation method.

The present invention also provides a rubber composition including the nitrile-based rubber and a nitrile-based rubber molded article prepared using the rubber composition.

Technical Solution

According to an aspect of the present invention, there is provided a method for preparing a nitrile-based rubber having an amount of ethylenically unsaturated nitrile in a molecule of 34 wt % or less including: preparing a latex including a nitrile-based rubber by performing a polymerization reaction by adding an ethylenically unsaturated nitrile-based monomer in two or more portions to a conjugated diene-based monomer; and coagulating the latex by adding a sulfur-based coagulant to the latex.

According to another aspect of the present invention, there is provided a nitrile-based rubber prepared by the above-described method.

According to another aspect of the present invention, there is provided a rubber composition including the nitrile-based rubber and a nitrile-based rubber molded article prepared using the rubber composition.

Advantageous Effects

A method for preparing a nitrile-based rubber according to the present invention may suppress the generation of a conjugated diene block, such as butadiene, by dividedly adding ethylenically unsaturated nitrile in a polymerization process of ethylenically unsaturated nitrile and conjugated diene during the preparation of a low temperature resistant nitrile-based rubber including ethylenically unsaturated nitrile of 34 wt % or less. As a result, the method may improve resilience, processability, and low temperature characteristics, and may also improve vulcanization properties and mechanical properties of the rubber by uniformly dispersing colloidal sulfur in the nitrile-based rubber by adding colloidal sulfur to a polymer in the state of latex, which is generated as a result of a polymerization reaction, and coagulating the polymer. Accordingly, the nitrile-based rubber prepared by the above preparation method may be used in various areas, such as rubber products, electrical components, automotive parts, and industrial goods, and may be particularly suitable to the preparation of rubber gloves, tires, foamed insulation materials, or hoses due to its improved mechanical properties as well as excellent processability and low temperature characteristics.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A method for preparing a nitrile-based rubber according to an embodiment of the present invention includes preparing a latex including a nitrile-based rubber by performing a polymerization reaction by adding an ethylenically unsaturated nitrile-based monomer in two or more portions to a conjugated diene-based monomer (step 1); and preparing a nitrile-based rubber having an amount of ethylenically unsaturated nitrile in a molecule of 34 wt % or less by adding a sulfur-based coagulant to the latex and coagulating the latex (step 2).

Hereinafter, the method is described in detail for each step. In the method for preparing a nitrile-based rubber according to the embodiment of the present invention, step 1 is a step of preparing a latex including a nitrile-based rubber by performing a polymerization reaction of a conjugated diene-based monomer and an ethylenically unsaturated nitrile-based monomer.

In step 1, an amount of the ethylenically unsaturated nitrile-based monomer used for the preparation of the latex is not added at a time, but the ethylenically unsaturated nitrile-based monomer may be added in two or more portions, or two to four portions in order to suppress the generation of a conjugated diene block in the finally prepared nitrile-based rubber.

The addition amount and the number of additions of the ethylenically unsaturated nitrile-based monomer may be determined by a polymerization conversion rate. In the present invention, the polymerization conversion rate according to polymerization conditions may be measured by recording a polymerization conversion rate curve according to a ratio of a vinyl chloride monomer to butane depending on time for setting polymerization conditions using a butane tracer equipped with gas chromatography for each polymerization condition. Also, the meaning of 0% polymerization conversion rate includes a polymerization initiation point or a point before polymerization initiation.

Specifically, in a case in which the ethylenically unsaturated nitrile-based monomer is added in three portions, wt % to 60 wt % of a total amount of the ethylenically unsaturated nitrile-based monomer used may be added at an initial stage of polymerization (when the polymerization conversion rate is 0%), 20 wt % to 30 wt % of the total amount may be added when the polymerization conversion rate is 25%, and the remaining amount may be added when the polymerization conversion rate is 50%. Also, in a case in which the ethylenically unsaturated nitrile-based monomer is added in four portions, 50 wt % to 60 wt % of the total amount of the ethylenically unsaturated nitrile-based monomer used may be added at the initial stage of polymerization (when the polymerization conversion rate is 0%), 15 wt % to 25 wt % of the total amount may be added when the polymerization conversion rate is 20%, 10 wt % to 15 wt % of the total amount may be added when the polymerization conversion rate is 40%, and the remaining amount may be added when the polymerization conversion rate is 60%.

Also, the amount of the ethylenically unsaturated nitrile-based monomer used may be determined in consideration of an amount of ethylenically unsaturated nitrile in the finally prepared nitrile-based rubber. The ethylenically unsaturated nitrile-based monomer may be used in an amount to provide an amount of ethylenically unsaturated nitrile in the finally prepared nitrile-based rubber of 34 wt % or less, specifically, 18 wt % to 32 wt %, and, more specifically, 22 wt % to 28 wt %.

Furthermore, the ethylenically unsaturated nitrile-based monomer may be acrylonitrile, methacrylonitirle, α-chloronitrile, or α-cyanoethylacrylonitirle, and these materials may be used alone or in a mixture of two or more thereof. For example, the ethylenically unsaturated nitrile-based monomer may be acrylonitrile.

The conjugated diene-based monomer may be 1,3-butadiene, 1,4-butadiene, 2,3-dimethyl-1,3-butadiene, 2-ethyl-1,3-butadiene, 1,3-pentadiene, or isoprene, and these materials may be used alone or in a mixture of two or more thereof. For example, the conjugated diene-based monomer may be 1,3-butadiene.

The conjugated diene-based monomer may be used in an amount of 66 wt % to 88 wt % based on a total amount of the monomers used for the preparation of the nitrile-based rubber. In a case in which the amount of the conjugated diene-based monomer used is less than 66 wt %, physical properties of the nitrile-based rubber may be deteriorated, for example, the finally prepared nitrile-based rubber becomes hard, and in a case in which the amount of the conjugated diene-based monomer used is greater than 88 wt %, since the amount of the ethylenically unsaturated nitrile-based monomer may be relatively decreased, oil resistance and tensile strength of the finally prepared nitrile-based rubber may be deteriorated.

Also, the polymerization reaction in step 1 may be performed by radical polymerization. Specifically, the polymerization reaction may be bulk polymerization, solution polymerization, suspension polymerization, or emulsion polymerization, and for example, may be emulsion polymerization.

Furthermore, during the polymerization reaction in step 1, a sulfonate-based emulsifier and a fatty acid may be further selectively used in order to promote the reaction and prevent the contamination of a mold during a high-temperature vulcanization process, such as injection molding, by improving the stability of the prepared latex.

Specifically, 0.2 part by weight to 1 part by weight of the sulfonate-based emulsifier and 0.9 part by weight to 3 parts by weight of the fatty acid may be used based on 100 parts by weight of a mixture of the conjugated diene-based monomer and the ethylenically unsaturated nitrile-based monomer for the preparation of the nitrile-based rubber. In a case in which the amount of the sulfonate-based emulsifier used is less than 0.2 part by weight, an effect due to the use of the sulfonate-based emulsifier may be insignificant, and in a case in which the amount of the sulfonate-based emulsifier used is greater than 1 part by weight, a coagulation reaction in step 2 to be described later may not be properly performed. Also, in a case in which the amount of the fatty acid is less than 0.9 part by weight, a polymerization rate may decrease and the stability of the prepared latex may be reduced, and in a case in which the amount of the fatty acid is greater than 3 parts by weight, the coagulation reaction in step 2 to be described later may not be properly performed.

The sulfonate-based emulsifier, specifically, may be alkyl aryl sulfonate such as sodium dodecylbenzene sulfonate (SDBS). In this case, the alkyl may be an alkyl group having 1 to 20 carbon atoms, for example, an alkyl group having 10 to 20 carbon atoms.

Also, the fatty acid may be a saturated fatty acid having 10 to 20 carbon atoms such as lauric acid, myristic acid, palmitic acid, stearic acid, or eicosanoic acid; or an unsaturated fatty acid having 10 to 20 carbon atoms such as oleic acid, and any one thereof or a mixture of two or more thereof may be used.

Furthermore, during the polymerization reaction in step 1, at least one typical additive for facilitating radical polymerization, for example, at least one additive, such as a polymerization initiator, a chain transfer agent, an emulsifier, a chelating agent, a dispersant, a pH adjuster, a deoxidizer, an antioxidant, or an oxygen scavenger, may be further selectively used.

Specifically, the polymer initiator may be included in an amount of 0.01 part by weight to 2 parts by weight based on 100 parts by weight of the mixture of the conjugated diene-based monomer and the ethylenically unsaturated nitrile-based monomer for the preparation of the nitrile-based rubber.

The polymer initiator is not particularly limited, but, for example, may be a radical initiator. Specific examples of the radical initiator may be inorganic peroxides such as sodium persulfate, potassium persulfate, ammonium persulfate, potassium perphosphate, or hydrogen peroxide; organic peroxides such as t-butyl peroxide, cumene hydroperoxide, p-menthane hydroperoxide, di-t-butyl peroxide, t-butyl cumyl peroxide, acetyl peroxide, isobutyl peroxide, octanoyl peroxide, dibenzoyl peroxide, 3,5,5-trimethylhexanol peroxide, or t-butyl peroxy isobutyrate; and nitrogen-based compounds such as azobisisobutyronitrile, azobis-2,4-dimethylvaleronitrile, azobiscyclohexanecarbonitrile, or azobis methyl isobutyric acid, and any one thereof or a mixture of two or more thereof may be used.

Also, an amount of the chain transfer agent used may be determined depending on the type thereof, and specifically, the chain transfer agent may be included in an amount of 0.1 part by weight to 0.9 part by weight based on 100 parts by weight of the mixture of the conjugated diene-based monomer and the ethylenically unsaturated nitrile-based monomer for the preparation of the nitrile-based rubber.

The type of the chain transfer agent is not particularly limited. Specifically, the chain transfer agent may be mercaptans such as α-methyl styrene dimer, t-dodecyl mercaptan, n-dodecyl mercaptan, or octyl mercaptan; halogenated hydrocarbons such as carbon tetrachloride, methylene chloride, or methylene bromide; and sulfur-containing compounds such as tetraethyl thiuram disulfide or dipentamethylene thiuram disulfide, and for example, may be t-dodecyl mercaptan.

Also, the polymerization reaction in step 1 may be performed in a temperature range of 10° C. to 90° C., for example, 10° C. to 75° C.

As a result of the above-described polymerization reaction, a latex including a nitrile-based rubber, in which the generation of conjugated diene, particularly, butadiene block, is suppressed, is prepared.

Furthermore, in the method for preparing a nitrile-based rubber according to the embodiment of the present invention, step 2 is a step of preparing a nitrile-based rubber by adding a sulfur-based coagulant to the latex prepared in step 1 and coagulating the latex.

The sulfur-based coagulant, specifically, may be colloidal sulfur.

Typically, calcium chloride has mainly been used in the coagulation of latex. However, since calcium chloride has low miscibility with a nitrile-based rubber, the calcium chloride may deteriorate physical properties of the nitrile-based rubber. Thus, in the present invention, since colloidal sulfur having better miscibility with a nitrile-based rubber is particularly used among sulfur-based materials typically used in the vulcanization of a rubber composition after the coagulation of latex, the colloidal sulfur is allowed to be uniformly dispersed by increasing the dispersibility of the colloidal sulfur as a coagulant in the rubber, and as a result, the vulcanization characteristics and mechanical properties of the nitrile-based rubber may be improved.

With respect to sulfur typically used as a vulcanizing agent, the sulfur in a solid state is kneaded with a raw material rubber, a vulcanization accelerator, and an antioxidant using a roll mill or a sealed mixer and is then subjected to a vulcanization process. In this case, the dispersion of the vulcanizing agent is not uniform and the vulcanizing agent is bonded to an end of the nitrile-based rubber. In contrast, in a case in which sulfur is used as a coagulant in the coagulation step of latex as in the present invention, cross-linking between polymer chains of the nitrile-based rubber may be formed. The addition of sulfur in the nitrile-based rubber may be analyzed and confirmed by x-ray microanalysis or X-ray fluorescence analysis. Specifically, an absorption spectrum of a residue remaining after burning 2 g of an unvulcanized rubber sample at 600° C. for 2 hours in a furnace may be measured and evaluated by an X-ray microanalyzer.

For example, the sulfur-based coagulant may be colloidal sulfur including sulfur having an average particle diameter ($D_{50}$) of 5 µm or less or 1 µm to 3 µm. In a case in which the average particle diameter of the sulfur-based coagulant is greater than 5 µm, the mixing of the sulfur-based coagulant into the nitrile-based rubber may not be facilitated. In the present invention, the average particle diameter ($D_{50}$) of the sulfur, for example, may be measured by using a laser diffraction method. The laser diffraction method may generally measure a particle diameter ranging from a submicron level to a few mm, and may obtain highly repeatable and high resolution results. Specifically, a method of measuring the average particle diameter ($D_{50}$) of the sulfur in the colloidal sulfur may be performed in such a manner that the colloidal sulfur is dispersed in a solvent, the solvent is introduced into a commercial laser diffraction particle size measurement instrument (e.g., Microtrac MT 3000) and irradiated with ultrasonic waves having a frequency of about 28 kHz and an output of 60 W, and the average particle diameter ($D_{50}$) at 50% in a cumulative particle diameter distribution of the measurement instrument may then be calculated.

Also, the sulfur-based coagulant may be used in an amount of 0.1 part by weight to 10 parts by weight based on 100 parts by weight of the latex prepared in step 1. In a case in which the amount of the sulfur-based coagulant used is less than 0.1 part by weight, an effect of improving the vulcanization characteristics and mechanical properties of the nitrile-based rubber may be insignificant, and in a case in which the amount of the sulfur-based coagulant used is greater than 10 parts by weight, low-temperature properties of the nitrile-based rubber may be deteriorated. In consideration of the effect of improving the physical properties of the nitrile-based rubber according to the use of the sulfur-based coagulant, the sulfur-based coagulant, for example, may be included in an amount of 0.1 part by weight to 5 parts by weight based on 100 parts by weight of the latex.

Furthermore, in step 2, any one selected from the group consisting of sulfurs, such as sulfur powder, sublimated sulfur, precipitated sulfur, surface-treated sulfur, and insoluble sulfur, or a mixture of two or more thereof may be further used in addition to the above-described sulfur-based coagulant.

The reaction in step 2 may be performed in a temperature range of 50° C. to 80° C., for example, 60° C. to 70° C.

As a result of step 2, a latex coagulum including the nitrile-based rubber is obtained.

Also, after the process of step 2, an impurity removal process for removing impurities, such as the residual emulsifier and coagulant, from the latex coagulum thus obtained may be further selectively performed. Accordingly, the method for preparing a nitrile-based rubber according to the embodiment of the present invention may further include the impurity removal process after the process of step 2.

The impurity removal process, specifically, may be performed by a method of washing the latex coagulum including the nitrile-based rubber with an inorganic salt aqueous solution, and for example, may be performed by heating the inorganic salt aqueous solution to 50° C. to 70° C., then adding the latex coagulum including the nitrile-based rubber, and stirring the solution for 10 minutes to 1 hour.

The inorganic salt aqueous solution is obtained by adding distilled water to an inorganic salt and mixing the mixture, wherein the inorganic salt aqueous solution is not particularly limited but may have a pH of 10 to 12.

Also, the inorganic salt, specifically, may be sodium hydroxide, potassium hydroxide, calcium hydroxide, magnesium hydroxide, or lithium hydroxide, and any one thereof or a mixture of two or more thereof may be used. For example, the inorganic salt may be potassium hydroxide.

Furthermore, a drying process may be further selectively performed after the impurity removal process. In this case, the drying process may be performed by a typical method such as a hot-air treatment or a heat treatment.

The nitrile-based rubber prepared according to the above-described method has improved mechanical properties as well as excellent processability and low temperature characteristics. Specifically, the nitrile-based rubber according to the embodiment of the present invention may have an amount of acrylonitrile in the polymer of 34 wt % or less and may have a structure of the following Formula 1.

[Formula 1]

In Formula, 1, m and n represent a molar ratio of a repeating unit and each may be an integer of 1 or more.

Also, x in the above Formula represents the number of sulfurs derived from the colloidal sulfur and may be an integer of 1 or more.

Furthermore, the nitrile-based rubber prepared by the preparation method according to the present invention suppresses the generation of the butadiene block by dividedly adding acrylonitrile in the preparation process and thus, the amount of the butadiene block may be reduced in comparison to a typical nitrile-based rubber. As a result, improved mechanical properties as well as excellent processability and low temperature characteristics may be obtained.

Since the nitrile-based rubber prepared by the preparation method according to the embodiment of the present invention has improved mechanical properties as well as excellent processability and low temperature characteristics, the nitrile-based rubber prepared by the above preparation method may be used in various areas, such as rubber products, electrical components, automotive parts, and industrial goods, and may be particularly suitable to the preparation of rubber gloves, tires, foamed insulation materials, or hoses.

Also, according to another embodiment of the present invention, a rubber composition including the above-described nitrile-based rubber is provided.

Specifically, the rubber composition may include the above-described nitrile-based rubber as a raw material rubber, and may further include an additive for satisfying functions and physical properties required according to the use of the rubber composition.

The additive may include sulfur such as sulfur powder, sublimated sulfur, precipitated sulfur, surface-treated sulfur, or insoluble sulfur; a vulcanizing agent of sulfur-based compounds such as sulfur chloride, sulfur dichloride, morpholine disulfide, alkylphenol disulfide, N,N'-dithio-bis(hexahydro-2H-azepinone), or polysulfide; a vulcanization accelerator such as zinc oxide, N-tert-butyl-2-benzothiazole sulfenamide (TBBS) or tetramethylthiuram monosulfide (TMTM); a dispersant such as stearic acid, oleic acid, palmitic acid, or anhydrous maleic acid; a reinforcing filler such as carbon black, silica, limestone, mica, clay, or bentonite; an emulsifier such as alkyl aryl sulfonate; or an adipate-based or phthalate-based dissolution promoter such as di(2-ethylhexyl)adipate, di(2-ethylhexyl)phthalate, and diisodecyl phthalate, and, in addition, the additive may include a pigment, a thickener, a chelating agent, a pH adjuster, a deoxidizer, a particle size modifier, an antioxidant, or an oxygen scavenger. These additives may be added alone or as a mixture of two or more thereof within an amount range that does not inhibit the effect of the rubber composition.

Specifically, the rubber composition may further include 0.1 part by weight to 5 parts by weight of the vulcanizing agent, 0.1 part by weight to 10 parts by weight of the vulcanization accelerator, 0.1 part by weight to 5 parts by weight of the dispersant, and 10 parts by weight to 50 parts by weight of the reinforcing filler based on 100 parts by weight of the nitrile-based rubber. The rubber composition having the above composition exhibits excellent processability and low-temperature properties. Specifically, the rubber composition has a Mooney viscosity at 100° C. of 40 to 90, for example, 50 to 75.5, a maximum torque (MH) of 17 dNm to 18.5 dNm when measured by using an oscillating disc rheometer, and a tensile strength of 270 kg·f/cm$^2$ to 280 kg·f/cm$^2$.

Also, the rubber composition has a hardness of 70 to 75 when the hardness is measured at 25° C. according to ASTM D2240.

The rubber composition has a Ts'1 (time required for the completion of 1% vulcanization) of 1.49 minutes or less, for example, 1.40 minutes to 1.49 minutes, and has a Tc'90 (time required for the completion of 90% vulcanization) of 6.11 minutes or less, for example, 5.85 minutes to 6.11 minutes.

Furthermore, the rubber composition has an elongation of 395% to 465% after vulcanizing at 145° C. for 45 minutes, and has a 300% modulus of 160 to 178 when elongated by 300% after vulcanizing at 145° C. for 45 minutes.

According to another embodiment of the present invention, a nitrile-based rubber molded article prepared using the above-described rubber composition is provided.

The nitrile-based rubber molded article may be prepared by a typical molding process except that the above-described rubber composition is used.

Hereinafter, exemplary embodiments will be described in detail to fully explain the present invention in such a manner that it may easily be carried out by a person with ordinary skill in the art to which the present invention pertains. However, the present invention may be modified in various forms and is not limited to the disclosed embodiments.

Example 1: Preparation of Nitrile-Based Rubber 82 wt % of 1,4-butadiene and 18 wt % of acrylonitrile were emulsion-polymerized in water to prepare a nitrile rubber latex. In this case, 0.6 part by weight of sodium dodecylbenzene sulfonate, 0.9 part by weight of lauric acid as a fatty acid, and 0.5 part by weight of t-dodecyl mercaptan were respectively added to 100 parts by weight of the monomer mixture of 1,4-butadiene and acrylonitrile. Also, when adding the acrylonitrile, the acrylonitrile was dividedly added in such a manner that 54.5 wt % of a total amount of the acrylonitrile used was added at an initial stage of polymerization when a polymerization conversion rate was 0%, 17.8 wt % of the total amount was added when the polymerization conversion rate was 20%, 15 wt % of the total amount was added when the polymerization conversion rate was 40%, and the remaining amount was added when the polymerization conversion rate was 60%. The polymerization reaction was terminated when the polymerization conversion rate was 80%, and the reaction time was 7 hours.

Colloidal sulfur (average particle diameter ($D_{50}$) of sulfur: 5 μm) was added to the prepared nitrile rubber latex and heated to 60° C. to perform coagulation. In this case, the colloidal sulfur was added in an amount of 10 parts by weight based on 100 parts by weight of the latex. The latex coagulum thus obtained was added while heating a potassium hydroxide aqueous solution (1000 parts by weight based on 100 parts by weight of the coagulum) having a pH of 12 prepared in advance to 50° C., stirred for 10 minutes, and then dried to obtain a nitrile-based rubber. The polymerization conversion rate was confirmed in such a manner that a reactant sampled at a random polymerization reaction time in the course of the polymerization reaction after the initiation of the polymerization reaction was heated to 100° C., an amount of a polymer generated was then measured, and a fraction of the generated polymer to a total amount of materials added until the corresponding polymerization reaction time was calculated.

Example 2: Preparation of Nitrile-Based Rubber

A nitrile-based rubber was prepared in the same manner as in Example 1 except that 22 wt % of acrylonitrile was used and colloidal sulfur was used in an amount of 5 parts by weight based on 100 parts by weight of the latex, as listed in Table 1 below.

Example 3: Preparation of Nitrile-Based Rubber

A nitrile-based rubber was prepared in the same manner as in Example 1 except that 26 wt % of acrylonitrile was used, the acrylonitrile was added in three portions, and colloidal sulfur was used in an amount of 1 part by weight based on 100 parts by weight of the latex, as listed in Table 1 below.

In this case, the acrylonitrile was added in three portions in such a manner that 58.9 wt % of a total amount of the acrylonitrile used was added at an initial stage of polymerization when a polymerization conversion rate was 0%, 20.7 wt % of the total amount was added when the polymerization conversion rate was 25%, and the remaining amount was added when the polymerization conversion rate was 50%.

Example 4: Preparation of Nitrile-Based Rubber

A nitrile-based rubber was prepared in the same manner as in Example 1 except that 28 wt % of acrylonitrile was used, the acrylonitrile was added in three portions, and colloidal sulfur was used in an amount of 0.5 part by weight based on 100 parts by weight of the latex, as listed in Table 1 below.

In this case, the acrylonitrile was added in three portions in such a manner that 58.9 wt % of a total amount of the acrylonitrile used was added at an initial stage of polymerization when a polymerization conversion rate was 0%, 20.7 wt % of the total amount was added when the polymerization conversion rate was 25%, and the remaining amount was added when the polymerization conversion rate was 50%.

Example 5: Preparation of Nitrile-Based Rubber

A nitrile-based rubber was prepared in the same manner as in Example 1 except that 32 wt % of acrylonitrile was used, the acrylonitrile was added in two portions, and colloidal sulfur was used in an amount of 1 part by weight based on 100 parts by weight of the latex, as listed in Table 1 below.

In this case, the acrylonitrile was dividedly added in such a manner that 50 wt % of a total amount of the acrylonitrile used was added at an initial stage of polymerization when a polymerization conversion rate was 0% and the remaining amount was added when the polymerization conversion rate was 50%.

Comparative Example 1: Preparation of Nitrile-Based Rubber 78 wt % of 1,4-butadiene and 22 wt % of acrylonitrile were emulsion-polymerized in water to prepare a latex including a nitrile rubber. In this case, 0.6 part by weight of sodium dodecylbenzene sulfonate, 0.9 part by weight of fatty acid, and 0.5 part by weight of t-dodecyl mercaptan were respectively added to 100 parts by weight of the monomer mixture of 1,4-butadiene and acrylonitrile. Also, when adding the acrylonitrile, the acrylonitrile was added in four portions in such a manner that 54.5 wt % of a total amount of the acrylonitrile used was added at an initial stage of polymerization when a polymerization conversion rate was 0%, 17.8 wt % of the total amount was added when the polymerization conversion rate was 20%, 15 wt % of the total amount was added when the polymerization conversion rate was 40%, and the remaining amount was added when the polymerization conversion rate was 60%. The polymerization reaction was terminated when the polymerization conversion rate was 80%.

A calcium chloride aqueous solution (amount of calcium chloride based on 100 parts by weight of the latex: 2 parts by weight) was added as a coagulant to the prepared nitrile rubber-containing latex and heated to 60° C. to perform coagulation. The latex coagulum thus obtained was added while heating a potassium hydroxide aqueous solution (1000 parts by weight based on 100 parts by weight of the coagulum) having a pH of 12 prepared in advance to 50° C., stirred for 10 minutes, and then dried to obtain a nitrile-based rubber.

Comparative Example 2: Preparation of Nitrile-Based Rubber 78 wt % of 1,4-butadiene and 22 wt % of acrylonitrile were emulsion-polymerized in water to prepare a latex including a nitrile rubber. In this case, 0.6 part by weight of sodium dodecylbenzene sulfonate, 0.9 part by weight of fatty acid, and 0.5 part by weight of t-dodecyl mercaptan were respectively added to 100 parts by weight of the monomer mixture of 1,4-butadiene and acrylonitrile. 100 wt % of a total amount of the acrylonitrile used was added at an initial stage of polymerization when a polymerization conversion rate was 0%. The polymerization reaction was terminated when the polymerization conversion rate was 80%.

A calcium chloride aqueous solution (amount of calcium chloride based on 100 parts by weight of the latex: 2 parts by weight) was added as a coagulant to the prepared nitrile rubber-containing latex and heated to 60° C. to perform coagulation. The latex coagulum thus obtained was added while heating a potassium hydroxide aqueous solution (1000 parts by weight based on 100 parts by weight of the coagulum) having a pH of 12 prepared in advance to 50° C., stirred for 10 minutes, and then dried to obtain a nitrile-based rubber.

Comparative Example 3: Preparation of Nitrile-Based Rubber

A nitrile-based rubber was prepared in the same manner as in Comparative Example 2 except that 28 wt % of acrylonitrile was used in Comparative Example 2.

Comparative Example 4: Preparation of Nitrile-Based Rubber 78 wt % of 1,4-butadiene and 32 wt % of acrylonitrile were emulsion-polymerized in water to prepare a latex including a nitrile rubber. In this case, 0.6 part by weight of sodium dodecylbenzene sulfonate, 0.9 part by weight of fatty acid, and 0.5 part by weight of t-dodecyl mercaptan were respectively added to 100 parts by weight of the monomer mixture of 1,4-butadiene and acrylonitrile. 100 wt % of a total amount of the acrylonitrile used was added at an initial stage of polymerization. The polymerization reaction was terminated when the polymerization conversion rate was 80%.

Colloidal sulfur (average particle diameter ($D_{50}$) of sulfur: 5 μm) was added to the prepared nitrile rubber-containing latex and heated to 60° C. to perform coagulation. In this case, the colloidal sulfur was added in an amount of 1 part by weight based on 100 parts by weight of the latex. The latex coagulum thus obtained was added while heating a potassium hydroxide aqueous solution (1000 parts by weight based on 100 parts by weight of the coagulum) having a pH of 12 prepared in advance to 50° C., stirred for 10 minutes, and then dried to obtain a nitrile-based rubber.

TABLE 1

| Category | Example | | | | | Comparative Example | | | |
| --- | --- | --- | --- | --- | --- | --- | --- | --- | --- |
| | 1 | 2 | 3 | 4 | 5 | 1 | 2 | 3 | 4 |
| Amount of acrylonitrile (ACN) (wt %) | 18 | 22 | 26 | 28 | 32 | 22 | 22 | 28 | 32 |
| The number of additions of ACN in portions (times) | 4 | 4 | 3 | 3 | 2 | 4 | 1 | 1 | 1 |
| Amount of colloidal sulfur added (parts by weight) | 10 | 5 | 1 | 0.5 | 1 | 0 | 0 | 0 | 1 |

Experimental Example 1: Nitrile-Based Rubber Analysis

Analysis of inorganic components in the nitrile-based rubbers prepared in Example 2 and Comparative Example 1 was performed through X-ray microanalysis.

Specifically, 2 g of the nitrile-based rubber prepared in Example 2 or Comparative Example 1, as a sample, was put in a crucible, burnt at 600° C. for 2 hours in a furnace, and an amount of remaining ash was then measured. The ash was fixed to a carbon stub and the analysis of inorganic materials was then performed by energy dispersive spectroscopy (EDS). Fractions of sulfur in the ashes of the samples were obtained by measuring X-ray absorption spectra at 2.3075

KeV. The results thereof are presented in the following Table 2 and FIGS. 1 and 2, respectively.

Figure 1:
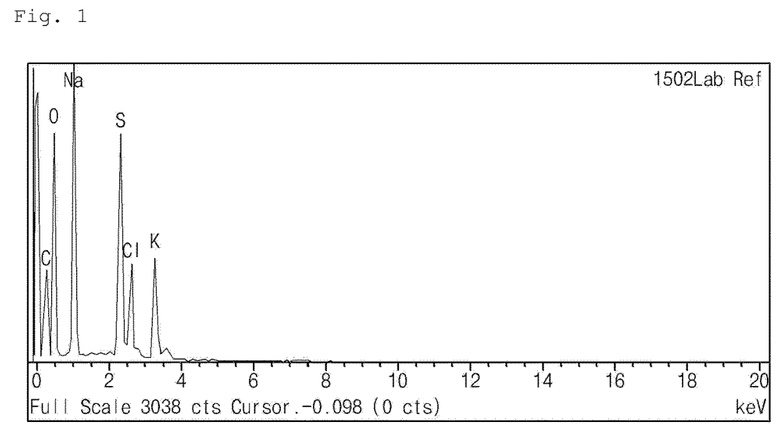
FIG. 1 illustrates the measurement results of X-ray absorption spectrum of a nitrile-based rubber of Example 2.
Figure 2:
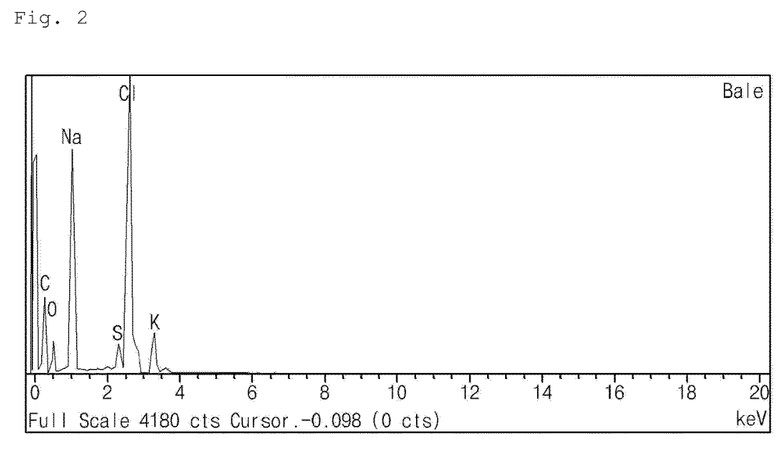
FIG. 2 illustrates the measurement results of X-ray absorption spectrum of a nitrile-based rubber of Comparative Example 1.

FIG. 1 shows an X-ray absorption spectrum of the nitrile-based rubber of Example 2, and FIG. 2 shows an X-ray absorption spectrum of the nitrile-based rubber of Comparative Example 1.

TABLE 2

|  | Example 2 (Ash content = 0.28%) | | Comparative Example 1 (Ash content = 0.29%) | |
|---|---|---|---|---|
|  | Wt % | At % | Wt % | At % |
| Na | 31.39 | 40.97 | 28.78 | 38.60 |
| S | 29.37 | 27.46 | 3.84 | 3.69 |
| Cl | 17.88 | 15.14 | 56.54 | 49.17 |
| K | 21.36 | 16.39 | 10.84 | 8.56 |
| Sum | 100 | | 100 | |

As illustrated in Table 2 and FIGS. 1 and 2, the nitrile-based rubber prepared in Example 2 had significantly higher amount of sulfur than Comparative Example 1. Accordingly, the presence of sulfur bonds in the nitrile-based rubber may be confirmed.

Experimental Example 2: Preparation and Evaluation of Nitrile-Based Rubber

In the method for preparing a nitrile-based rubber according to the present invention, changes in composition of each repeating unit in the nitrile-based rubber according to the number of additions of acrylonitrile in portions were investigated. The results thereof are presented in FIG. 3.

Figure 3:
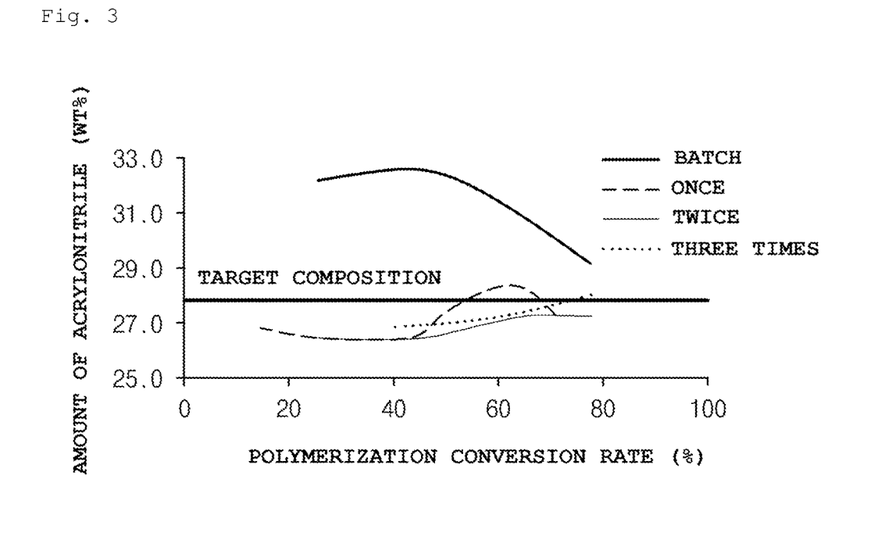
FIG. 3 is a graph illustrating changes in uniformity of the amount of acrylonitrile in nitrile-based rubbers according to the number of additions of acrylonitrile during the preparation of the nitrile-based rubbers in Experimental Example 2.
Figure 4:
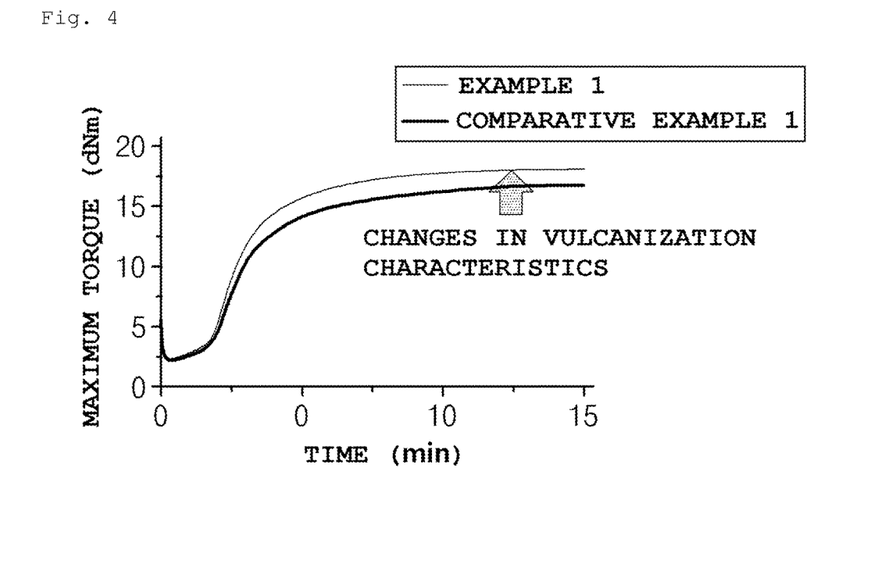
FIG. 4 is a graph illustrating changes in vulcanization characteristics of nitrile-based rubbers according to the use of colloidal sulfur during the preparation of the nitrile-based rubbers in Experimental Example 3.

FIG. 3 is a graph illustrating the results of changes in the amount of acrylonitrile according to a conversion rate when acrylonitrile is dividedly added.

In FIG. 3, the expression "batch" denotes that 100% of a total amount of acrylonitrile used was collectively added when the polymerization conversion rate was 0%. Also, in FIG. 3, the expressions "once", "twice", and "three times" denote the number of additions of acrylonitrile which was further added after the initial addition of acrylonitrile when the polymerization conversion rate was 0%. Specifically, the expression "once" in FIG. 3 denotes that acrylonitrile was added in two portions, in which 50 wt % was added when the polymerization conversion rate was 0% and the remaining amount was added when the polymerization conversion rate was 50%, and the expression "twice" in FIG. 3 denotes that acrylonitrile was added in three portions in which 58.9 wt % was added when the polymerization conversion rate was 0%, 20.7 wt % was added when the polymerization conversion rate was 25%, and the remaining amount was added when the polymerization conversion rate was 50%. Also, the expression "three times" in FIG. 3 denotes that acrylonitrile was added in three portions in which 54.4 wt % was added when the polymerization conversion rate was 0%, 17.8 wt % was added when the polymerization conversion rate was 20%, 15 wt % was added when the polymerization conversion rate was 40%, and the remaining amount was added when the polymerization conversion rate was 60%.

From the experimental results, as illustrated in FIG. 3, it may be understood that the amount of acrylonitrile in the nitrile-based rubber became uniform as the number of additions of acrylonitrile in portions was increased.

Experimental Example 3: Preparation and Evaluation of Rubber Composition

Processing characteristics and mechanical properties of rubber compositions respectively including the nitrile-based rubbers prepared in Examples 1 to 5 and Comparative Examples 1 to 4 as a raw material rubber were evaluated. Specifically, the rubber compositions were prepared by mixing formulations listed in the following Table 3 using Haake Rheomix equipped with Banbury rotor at 50° C. and 50 rpm for 8 minutes (premixing 1 minute and compounding 7 minutes), according to ASTM 3187-00.

TABLE 3

|  |  | Rubber composition | |
|---|---|---|---|
|  |  | Parts by weight | Addition amount (g) |
| Raw material rubber | NBR [1] | 100 | 140 |
| Vulcanization accelerator | Zinc oxide | 3 | 4.2 |
| Vulcanizing agent | Sulfur | 1.5 | 2.1 |
| Dispersant | Stearic acid | 1 | 1.4 |
| Reinforcing filler | CB [2] | 40 | 56 |
| Vulcanization accelerator | TBBS [3] | 0.7 | 0.98 |

In Table 3,
1) NBS: each nitrile-based rubber prepared in Examples 1 to 5 and Comparative Examples 1 to 4
2) CB: carbon black (N330™, Showa Cabot K.K.)
3) TBBS: N-tert-butyl-2-benzothiazole sulfenamide.

Various properties of the prepared rubber compositions such as Mooney viscosities were measured and evaluated by the following methods. The results thereof are presented in Table 4 below.

(1) Mooney Viscosity

Money viscosity (MV) was measured by using a Mooney viscometer (MV2000, Alpha Technologies) and reading the indication after rotating a big rotor for 4 minutes with preheating at 100° C. for 1 minute.

Also, Mooney viscosities (C-MV) of the polymers formulated with the addition of sulfur were measured, and hardness at 25° C. was measured according to ASTM D2240 in which the unit of hardness is Shore D scale.

(2) Vulcanization Characteristics

Maximum torque (MH) values were measured during vulcanization at 170° C. by using an oscillating disc rheometer.

Also, Ts'1 (time required for the completion of 1% vulcanization) and Tc'90 (time required for the completion of 90% vulcanization) were respectively measured.

(3) Mechanical Properties

The rubber compositions respectively including the nitrile-based rubbers prepared in Examples 1 to 5 and Comparative Examples 1 to 4 were vulcanized at 145° C. and tensile strengths (TS, kg-f/cm$^2$) of vulcanizates were then measured.

The rubber compositions respectively including the nitrile-based rubbers prepared in Examples 1 to 5 and Comparative Examples 1 to 4 were vulcanized at 145° C. for 45 min and elongations (%) of the vulcanizates were then measured.

The rubber compositions respectively including the nitrile-based rubbers prepared in Examples 1 to 5 and Comparative Examples 1 to 4 were vulcanized at 145° C. for 45 min and a modulus at 300% elongation, i.e., 300% modulus, was then measured.

TABLE 4

| Category | | Example | | | | | Comparative Example | | | |
|---|---|---|---|---|---|---|---|---|---|---|
| | | 1 | 2 | 3 | 4 | 5 | 1 | 2 | 3 | 4 |
| Physical properties | MV | 53.8 | 54.5 | 60.4 | 61.5 | 75.1 | 53.4 | 55.2 | 62.4 | 76.4 |
| | C-MV | 77.8 | 81.4 | 95.5 | 98.8 | 114.7 | 79.1 | 82.7 | 111.3 | 114.1 |
| | Hardness (Shore D) | 71 | 72 | 72.5 | 72.5 | 73.5 | 70.5 | 71 | 73 | 73.5 |
| Vulcanization characteristics | MH (dNm) | 17.5 | 17.1 | 17.4 | 18 | 18.2 | 15.9 | 15.8 | 16.7 | 18.6 |
| | Ts'1 (min) | 1.41 | 1.43 | 1.49 | 1.47 | 1.45 | 1.51 | 1.49 | 1.51 | 1.55 |
| | Tc'90 (min) | 5.97 | 5.87 | 6.11 | 6.02 | 6.01 | 6.77 | 6.52 | 6.82 | 6.12 |
| Mechanical properties | TS (kg·f/cm$^2$) | 271.2 | 273.4 | 279.2 | 279.5 | 276.4 | 254.5 | 261.3 | 260.4 | 278.1 |
| | Elongation (%) | 464.2 | 461.5 | 452.4 | 437.9 | 397.1 | 496.1 | 471.2 | 442.3 | 394.6 |
| | 300% modulus | 162.6 | 168 | 163.6 | 166.1 | 177.5 | 148.8 | 152.1 | 155.6 | 178.4 |

As illustrated in Table 4, the nitrile-based rubbers of Examples 1 to 5, which were prepared by adding acrylonitrile in two or more portions and by using colloidal sulfur as a coagulant of the polymerized latex according to the preparation method according to the embodiment of the present invention, had improved mechanical properties as well as excellent processability and low temperature characteristics in comparison to the rubbers of Comparative Example 1, in which calcium chloride was used as a coagulant of latex, Comparative Example 4, in which acrylonitrile was collectively added at the initial stage of polymerization, and Comparative Examples 2 and 3, in which acrylonitrile was collectively added and calcium chloride was used as a coagulant of latex. In particular, the nitrile-based rubber of Example 4, in which 0.5 part by weight of colloidal sulfur was added, had a more significant improvement effect.

In addition, in the preparation method according to the present invention, changes in the maximum torque (MH) of the rubber compositions including the nitrile rubbers of Example 1 and Comparative Example 1 were compared and investigated in the same manner as in the above-described experiment, in order to evaluate vulcanization properties of the nitrile-based rubber improved by using colloidal sulfur, and the results thereof are presented in Table 4.

As illustrated in Table 4, the nitrile-based rubber of Example 1 had a significantly increased maximum torque value in comparison to Comparative Example 1, and thus, it may be confirmed that the vulcanization properties of the nitrile-based rubber were improved by the use of colloidal sulfur as a coagulant.

The invention claimed is:

1. A method for preparing a nitrile-based rubber having an amount of ethylenically unsaturated nitrile of 34 wt % or less, the method comprising:
    preparing a latex by polymerizing an ethylenically unsaturated nitrile-based monomer and a conjugated diene-based monomer, wherein the ethylenically unsaturated nitrile-based monomer is added in two or more separate portions to a conjugated diene-based monomer during the preparation of the latex, and wherein 0.2 part by weight to 1 part by weight of a sulfonate-based emulsifier and 0.9 part by weight to 3 parts by weight of a fatty acid are further added based on 100 parts by weight of a mixture of the conjugated diene-based monomer and the ethylenically unsaturated nitrile-based monomer; and
    coagulating the latex by adding a sulfur-based coagulant to the latex.

2. The method of claim 1, wherein the ethylenically unsaturated nitrile-based monomer is added in two to four portions.

3. The method of claim 1, wherein 50 wt % to 60 wt % of a total amount of the ethylenically unsaturated nitrile-based monomer used is added at an initial stage of polymerization when a polymerization conversion rate is 0%, 20 wt % to 30 wt % of the total amount is added when the polymerization conversion rate is 25%, and a remaining amount is added when the polymerization conversion rate is 50%.

4. The method of claim 1, wherein 50 wt % to 60 wt % of a total amount of the ethylenically unsaturated nitrile-based monomer used is added at an initial stage of polymerization when a polymerization conversion rate is 0%, 15 wt % to 25 wt % of the total amount is added when the polymerization conversion rate is 20%, 10 wt % to 15 wt % of the total amount is added when the polymerization conversion rate is 40%, and a remaining amount is added when the polymerization conversion rate is 60%.

5. The method of claim 1, wherein the ethylenically unsaturated nitrile-based monomer is added in an amount to provide an amount of ethylenically unsaturated nitrile in the nitrile-based rubber of 22 wt % to 28 wt %.

6. The method of claim 1, wherein the ethylenically unsaturated nitrile-based monomer comprises any one selected from the group consisting of acrylonitrile, methacrylonitirle, α-chloronitrile, and α-cyanoethylacrylonitirle, or a mixture of two or more thereof.

7. The method of claim 1, wherein the conjugated diene-based monomer comprises any one selected from the group consisting of 1,3-butadiene, 1,4-butadiene, 2,3-dimethyl-1, 3-butadiene, 2-ethyl-1,3-butadiene, 1,3-pentadiene, and isoprene, or a mixture of two or more thereof.

8. The method of claim 1, wherein the sulfur-based coagulant is colloidal sulfur.

9. The method of claim 1, wherein the sulfur-based coagulant is colloidal sulfur including sulfur having an average particle diameter ($D_{50}$) of 5 μm or less.

10. The method of claim 1, wherein the sulfur-based coagulant is used in an amount of 0.1 part by weight to 10 parts by weight based on 100 parts by weight of the latex.

11. The method of claim 1, wherein the ethylenically unsaturated nitrile-based monomer is added in two to four portions, and the sulfur-based coagulant is used in an amount of 0.1 part by weight to 5 parts by weight based on 100 parts by weight of the latex.

12. The method of claim 1, wherein the coagulating of the latex is performed by heating the latex to 60° C. to 70° C. after the addition of the sulfur-based coagulant to the latex.

13. The method of claim 1, further comprising a process of removing impurities from a resultant coagulum by using an inorganic salt, after the coagulating of the latex.

14. The method of claim 13, wherein the inorganic salt comprises any one selected from the group consisting of sodium hydroxide, potassium hydroxide, calcium hydroxide, magnesium hydroxide, and lithium hydroxide, or a mixture of two or more thereof.

15. The method of claim 13, wherein the inorganic salt is used as an aqueous solution having a pH of 10 to 12.

16. A nitrile-based rubber prepared by the method of claim 1.

17. The nitrile-based rubber of claim 16, wherein the nitrile-based rubber comprises a structure of Formula 1:

[Formula 1]

in Formula 1, l, m, n, and x are each independently an integer of 1 or more.

18. A rubber composition comprising the nitrile-based rubber of claim 16.

19. The rubber composition of claim 18, further comprising 0.1 part by weight to 5 parts by weight of a vulcanizing agent, 0.1 part by weight to 10 parts by weight of a vulcanization accelerator, 0.1 part by weight to 5 parts by weight of a dispersant, and 10 parts by weight to 50 parts by weight of a reinforcing filler based on 100 parts by weight of the nitrile-based rubber.

20. The rubber composition of claim 19, wherein the rubber composition has a Mooney viscosity at 100° C. of 40 to 90, a maximum torque (MH) of 17 dNm to 18.5 dNm when measured at 170° C. by using an oscillating disc rheometer, and a tensile strength of 270 kg·f/cm² to 280 kg·f/cm².

21. A nitrile-based rubber molded article prepared using the rubber composition of claim 18.

* * * * *